(No Model.)
M. LALONDE.
COMBINED SAW SET, GAGE AND RAKER GUIDE.
No. 345,791. Patented July 20, 1886.
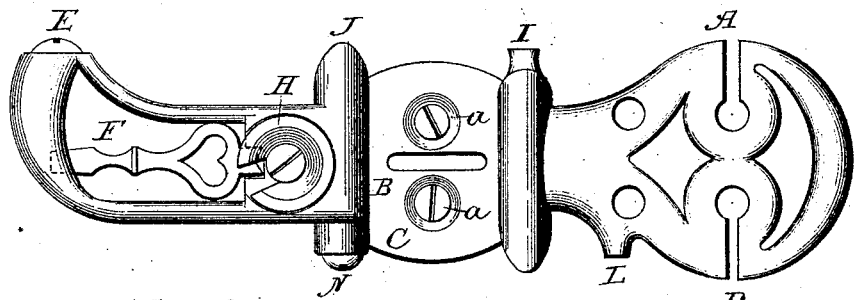
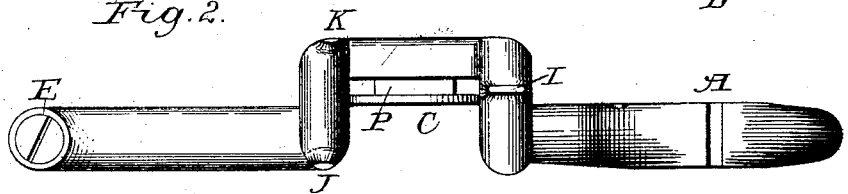
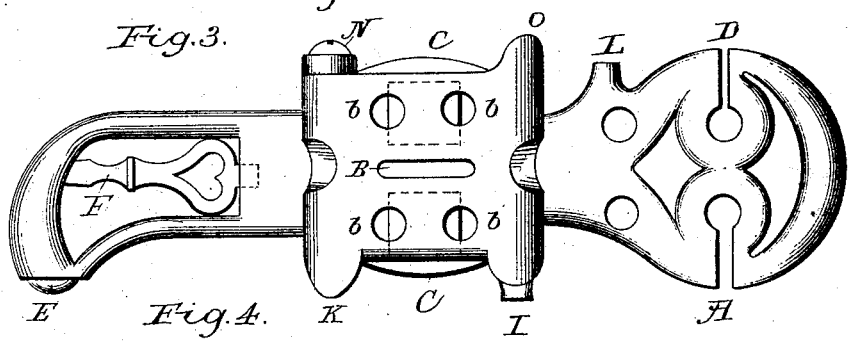
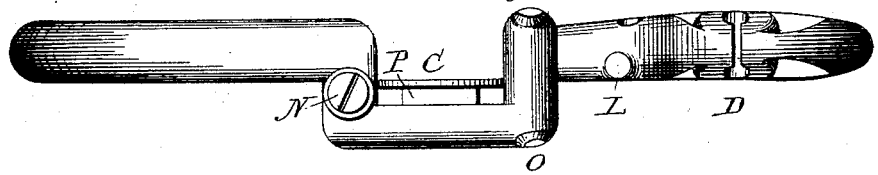
Witnesses:
Chas Kelley
N Morris
Inventor.
Maurice LaLonde
by Henry & Conville
Attorneys

UNITED STATES PATENT OFFICE.

MAURICE LALONDE, OF OSCODA, MICHIGAN.

COMBINED SAW SET, GAGE, AND RAKER-GUIDE.

SPECIFICATION forming part of Letters Patent No. 345,791, dated July 20, 1886.

Application filed July 30, 1885. Serial No. 173,067. (No model.)

*To all whom it may concern:*

Be it known that I, MAURICE LALONDE, a citizen of the United States, residing at Oscoda, in the county of Iosco and State of Michigan, have invented a new and useful Compound Saw-Set, Saw-Gage, and Raker-Guide, of which the following is a specification.

My invention relates to improvements in saw-fitting and saw-setting tools, in which is combined in one tool a saw-set, saw gage, and raker-guide, providing for a certain uniformity in the set of saw-teeth and equality and uniformity in rakers in crosscut-saws; and the objects of my improvements are, first, to provide for a practical combination of a saw-set, saw-gage, and raker-guide in one small handy tool; second, to afford facilities for procuring a uniformity in the set of the teeth of crosscut-saws, buck-saws, handsaws, and other saws of similar construction; third, to provide for an equalization of the length of the rakers in a crosscut-saw. I attain these objects by the mechanism illustrated in the accompanying drawings, in which—

Figure 1 is a full-face view of the compound tool as it rests when placed over the rakers of a crosscut-saw and the slotted steel plate C, through which the raker projects when the tool rests on the saw, also the screw-driver F as it is when adjusted and held in place when not in use. Fig. 2 is an edge view of the compound tool, showing the stock of the tool slotted at A, the rubber plate P, placed between the steel plate C and the back of the tool, also screw E. Fig. 3 is a full and correct view of the back of the compound tool, and is the back and opposite of Fig. 1. Fig. 4 is a full view of the edge of the compound tool back of and opposite to Fig. 2, showing the stock of the tool slotted at D, the projection L, the rubber plate P, as in Fig. 2, and screw N.

Similar letters refer to similar parts throughout the several views.

The slots A and D represent the places for the insertion of the saw-teeth when setting a saw. Slot B in plate C, Fig. 1, and slot B in the back of the tool in Fig. 3 are opposite, and represent the place through which the rakes of a crosscut-saw are placed while being jointed. The steel plate C is a smooth surface, over which the file passes while jointing the rakers. The plate of rubber P is placed between the middle of the tool and the steel plate C. Said rubber plate P is used instead of a metallic spring to raise or lower the steel plate C, by means of the screws $a\ a$, to suit the required length of the rakers. Screw E, by being turned in or out, determines the amount of set when placed, together with the projections J and K, against the side of the saw, leaving I on a level with the point of the tooth. Screw N operates in the same way, in conjuction with the projections M and O, in determining the amount of set in buck-saws, handsaws, and other like saws. Slot D, being smaller than slot A, is designed to be used on smaller saws, while slot A is designed to be used in setting crosscut-saws only. Projection L serves the same purpose in determining the extent and amount of set in small saws that I does in crosscut-saws.

$b\ b\ b\ b$ represent openings, affording lightness to the tool, and facilitates contraction and expansion of rubber plate P.

What I claim as my invention, and desire to secure by Letters Patent, is—

The compound tool herein described, comprising the stock slotted at A, D, and B, and having the projections, as shown, plates C and P, screws E N, $a\ a$, and H, and the screw-driver F, substantially as described.

MAURICE LALONDE.

In presence of—
CHAS. KELLEY,
WEBSTER MORRIS.